United States Patent [19]
Fraden

[11] Patent Number: 5,645,349
[45] Date of Patent: Jul. 8, 1997

[54] NONCONTACT ACTIVE TEMPERATURE SENSOR

[75] Inventor: Jacob Fraden, La Jolla, Calif.

[73] Assignee: Thermoscan Inc., San Diego, Calif.

[21] Appl. No.: 179,431

[22] Filed: Jan. 10, 1994

[51] Int. Cl.$^6$ .............. G01K 7/00; G01K 1/20; G01K 7/16
[52] U.S. Cl. .............................. 374/120; 374/164
[58] Field of Search .................... 374/164, 133, 374/120; 250/338.1, 341

[56] References Cited

U.S. PATENT DOCUMENTS

| | | | |
|---|---|---|---|
| 3,387,134 | 6/1968 | Trehame | 374/133 |
| 3,444,739 | 5/1969 | Trehame | 374/133 |
| 3,453,432 | 7/1969 | McHenry | 374/133 |
| 3,660,661 | 5/1972 | Lachambre | 374/133 |
| 3,768,059 | 10/1973 | Day | 374/133 |
| 4,204,429 | 5/1980 | Shimazaki et al. | 374/164 |
| 4,722,612 | 2/1988 | Junkert et al. | 374/133 |
| 4,854,730 | 8/1989 | Fraden | 374/164 |
| 5,054,936 | 10/1991 | Fraden | 374/164 |

FOREIGN PATENT DOCUMENTS

| | | | |
|---|---|---|---|
| 2145199 | 4/1972 | Germany | 374/164 |
| 7117547 | 6/1973 | Netherlands | 374/164 |

*Primary Examiner*—Diego F. F. Gutierrez
*Attorney, Agent, or Firm*—Hopgood, Calimafde, Kalil & Judlowe L.L.P.

[57] ABSTRACT

A noncontact active infrared sensor is provided with bifurcated sensing elements. A first element is uniquely exposed to the remote object, thereby establishing a radiative flux. A second element is configured in the same local environment as that of the first element but isolated from radiation from the remote object. The heat transfer of both elements is compared and that component of heat transfer corresponding to flux with the remote object is isolated and converted into a temperature signal. The sensor system advantageously incorporates individual thermal control units onto both sensor elements to accurately control salient thermal transfers while thermally decoupling the sensor elements. This provides for a more accurate reading of the temperature of the remote object.

9 Claims, 2 Drawing Sheets

NONCONTACT ACTIVE TEMPERATURE SENSOR

The present invention generally relates to noncontact temperature measuring systems, and in particular, devices and methods for infrared temperature measurement wherein error inducing signals are isolated and removed to insure reading accuracy.

BACKGROUND OF THE INVENTION

To measure temperature by means of infrared emission, thermal (infrared) radiation may be detected by many sensors known in the art. Thermal radiation has electromagnetic nature and thus can be detected either by quantum detectors or by thermal detectors. Quantum detectors, such as photoresistors or photodiodes, require cryogenic cooling to measure relatively low temperatures with high accuracy. On the other hand, thermal detectors, while not as sensitive as quantum, may operate at normal room temperatures. This invention relates to thermal detectors whose most popular application is in noncontact thermometers. One example of such a thermometer is an instant medical ear thermometer which is capable of noncontact measuring temperatures from tympanic membrane and surrounding tissues. Thermal sensors commonly used in infrared thermometers are thermopiles, pyroelectrics, bolometers, and active infrared detectors.

The purpose of an infrared sensor is to generate an electrical signal which is representative of net infrared flux $\Phi$ existing between the sensor and the object of measurement. The flux depends of two temperatures: the sensor's own surface temperature $T_s$ and that of the object (target) $T_b$. A relationship between the two temperatures and the flux is governed by Stefan-Boltzmann law:

$$\Phi = k\epsilon_b\epsilon_s(T_b^4 - T_s^4) \quad (1)$$

where $\epsilon_b$ and $\epsilon_s$ are emissivities of the target and sensor respectively, and k is a constant. An ultimate goal of a temperature measurement is determination of $T_b$. It is seen from the above equation that to calculate temperature $T_b$, one must first determine two variable numbers: a magnitude of infrared flux $\Phi$ and the sensor's surface temperature $T_s$.

A surface temperature can be measured by one of many temperature detectors known in the art, like thermistors or thermo-electrics, while measurement of net infrared flux requires an opto-electronic device known as thermal infrared sensor. There are two classes of thermal infrared sensors: passive infrared (PIR) and active far infrared (AFIR). Examples of PIR detectors are pyroelectrics, thermopiles, and bolometers. Measurement of infrared flux by a PIR sensor is not a simple task because PIR sensors with a good speed response are generally fabricated in a form of thin flakes or membranes, whose surface temperature $T_s$ is not only difficult to measure, but that temperature changes upon exposure to a target. Inaccurate determination of sensor's surface temperature $T_s$ results in error in a noncontact temperature calculation. Since sensor's surface temperature in a PIR detector changes upon exposure to a target, to improve response speed of the sensing element, its thermal capacity must be made very small. This imposes quite stringent requirements to a PIR sensor's design and increases cost.

An AFIR sensor, as opposed to PIR, operates at a predetermined (often constant) temperature $T_s$ of a sensing element. The AFIR sensors are based on U.S. Pat. Nos. 4,854,730 and 5,054,936 issued to Fraden. The operating principle of an AFIR sensor can be illustrated by the following example. In a sensor's housing, there is a sensing element which contains a temperature detector (for instance, a thermistor) and a heater (a constant+resistor). The heater is thermally coupled with the detector. The sensing element is connected to an electronic circuit which measures the element's temperature through a temperature detector and provides electric current to the heater to elevate its temperature above ambient. The circuit maintains the element's temperature on a predetermined $T_s$ level which in many cases is above the highest temperature of a target. Thus, being warm, an AFIR sensing element becomes a source of infrared radiation whose net flux is guided toward a target. The magnitude of that flux relates to a temperature gradient between the known temperature $T_s$ and the unknown temperature $T_b$ of a target. Under the idealized conditions, according to law of conservation of energy, heat $\Phi$ radiated from the sensor toward the target must be equal to electric power P supplied to the resistive heater. The idealized conditions here mean that the only way the element may lose its thermal energy is by radiating it toward the target. Electric power provided to the heater can be expressed through value of the heater's resistance, R, and voltage V across it:

$$P = \frac{V^2}{R} \quad (2)$$

Hence, combining equations (1) and (2), we can calculate the target temperature as $$T_b = \sqrt[4]{T_s^4 - \frac{V^2}{R\epsilon_s\epsilon_b k}} \quad (3)$$

It is seen that the calculated temperature of a target depends only of one variable which is the voltage V across the heating resistor. All other parts of equation (3) are either constant or predetermined. Further, if electronic circuit is efficient in maintaining $T_s$ level independent of $T_b$, the element's temperature doesn't change upon exposure to a target and the AFIR sensor becomes not only accurate but fast as well. This can be accomplished with no stringent requirements to thermal capacity of a sensing element. In effect, an AFIR sensor is a direct and efficient converter of electrical power into thermally radiated power. Value of $T_s$ typically is selected in the range from 40° to 100° C. For medical applications, it is preferably near 50° C.

In reality, an AFIR sensor doesn't operate under idealized conditions. Thermal energy dissipated by the heating resistor, goes not only toward the target, but to all components of a sensor's internal structure as well. Further, heat propagates from the element not only by means of radiation, but also through thermal conduction and gravitational convection of gas inside the sensor's housing. This makes use of formula (3) quite inaccurate, as it doesn't contain an additional variable whose influence becomes quite strong. This variable is temperature of the sensor's housing, or, in other words, the environmental (ambient) temperature. That is, a major difficulty in design and use of AFIR sensors relates to compensating for stray heat loss from the sensor system.

To compensate for undesirable thermal loss from a sensing element, several methods and system arrangements have been proposed. For example, see U.S. Pat. No. 4,854,730, and U.S. Pat. No. 5,054,936 issued to the present applicant. The teachings of these two patents are incorporated by reference as if restated herein in full. While these approaches have been successful in addressing some of the error inducing signals associated with AFIR sensors, there remains a need to enhance overall performance in signal isolation and reading accuracy. It was with this understanding of the prior art systems that the present invention was realized.

OBJECTS AND SUMMARY OF THE PRESENT INVENTION

It is a goal of the present invention to provide a method of noncontact temperature measurement where accuracy of the sensor is substantially independent of ambient temperature.

It is another object of the present invention to provide an active infrared temperature sensor with fast response speed.

It is another object of the present invention to provide an active infrared thermometer which is stable over a broad operating temperature range.

It is a further object of this present invention to provide an active infrared sensor having small dimensions.

It is yet a further goal of the present invention to provide an active infrared temperature sensor with predetermined optical properties.

The above and other objects of the present invention are realized in a specific sensor arrangement wherein two separate active sensor elements (AFIR) are placed in pre-selected orientation within a noncontact thermometer. By using two separate and distinct sensor elements, the target temperature signal can be isolated from other error inducing signal components normally associated with a single sensor element. More particularly, the first sensing element is used for emanating far infrared radiation toward a target, while a second, essentially identical sensing element, isolated from the target, generates a compensating signal reflective of the local environment for both sensing elements. This latter target independent signal is used to compensate for local ambient heat transfers, and thus permits calculation of an accurate target temperature.

To overcome limitations resulted from thermal crosstalk between the two separate sensor elements, the sensing elements are fabricated on separate, thermally decoupled substrates. Each element has its own electronic control circuit to maintain its temperature at a known pre-determined level. Preferably, temperatures of both elements are substantially the same. Each element contains an auxiliary heater and control circuit. The control circuit measures element temperature and applies heat via the resistor, to maintain a pre-set element temperature.

With this arrangement, stray thermal losses from both elements are nearly equal, while only the radiating element can emanate thermal radiation toward the target. Since stray heat loss from the radiating element is compensated for by the second element and its control circuit via an auxiliary heater, the radiating element and its control circuit need to respond only to the thermally radiated power. Since both sensing elements are thermally insulated from one another, control circuits can operate independently which assures their stable performance.

DESCRIPTION OF THE PRESENT INVENTION

Figure 1:
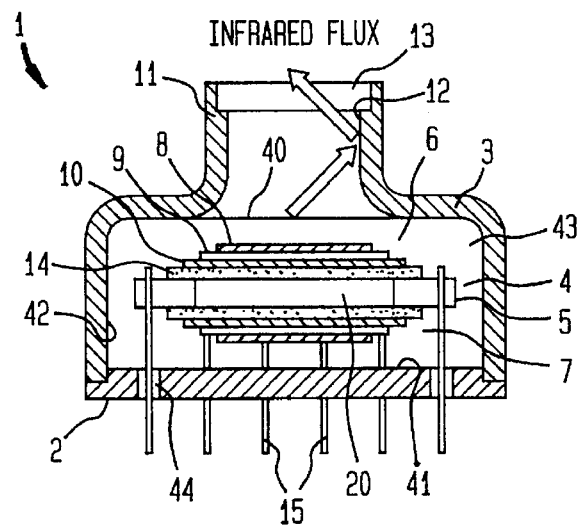
FIG. 1 is a cross-sectional view of an AFIR sensor with two sensing elements.
Figure 2:
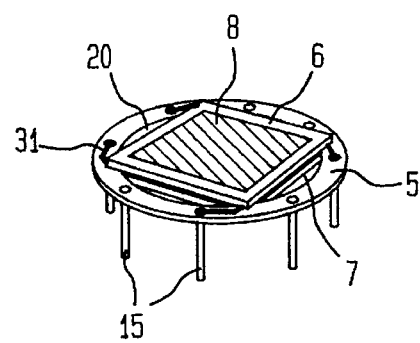
FIG. 2 shows a sensing assembly with two sensing elements supported by a common spacer.

Referring to FIG. 1, it is seen that AFIR sensor 1 is housed in a protective cap 3 whose purposes are to protect the interior from contaminations and to equalize thermal environment for the internal structure. Thus, cap 3 preferably should be fabricated of metal, however, some plastics and ceramics may be used for that purpose as well. The inner space 43 of sensor 1 is filled either with dry air or inert gas. Alternatively, gases may be evacuated to maintain vacuum in the inner space 43. The upper portion of cap 3 has an optical opening 40. That opening may be formed into an optical guide 11 to channel infrared flux toward desirable direction outside of the sensor. Inner surface 12 of guide 11 preferably should be highly reflective. Thus, it may be polished and gold plated, as gold is the most effective reflector in the far infrared spectral range.

The outer opening of optical guide 11 is protected by window 13. The window may be glued or welded to the optical guide. The window should have good transmitting characteristics in the far infrared spectral range. While it can be made of plastics, like polyolefins, the preferred materials are silicon, germanium, zinc selenide, AMTIR or other suitable hard crystalline or amorphous elements or compositions. To improve transmitting characteristics, a window can be given anti-reflecting coatings (ARC) geared for the operating wavelength.

Cap 3 is attached to header 2 by means of welding, soldering, or by an appropriate binder. Thus the combination of cap 3, window 13 and header 2 seals inner space 43.

Inside sensor 1, there is a sensing assembly 4 formed by spacer 5 and two elements 6 and 7. Radiating element 6 faces optical guide, while compensating element 7 faces the surface of header 2. Radiating element 6 is optically coupled to the outside of the sensor through optical guide 11 and window 13. Compensating element is sandwiched between spacer 5 and header 2. Surface 41 of header 2 is reflective and preferably gold plated, thus compensating element 7 has low level of radiation. To further reduce radiative coupling between elements 6 and 7 and the inner walls of the sensor, inner surface 42 of cap 3 is also reflective and preferably gold plated.

Spacer 5 is ring shaped with an opening in the center. This opening forms an empty cavity between the sensor elements to minimize thermal contact between elements 6 and 7. To further improve thermal insulation, space 20 may be filled with low thermal conductivity material. Sensing assembly 4 is supported by terminals 15 which also provide electrical connection to the outside circuits. To assure tight seal between terminals 15 and header 2, an insulating eyelets 44 may be used between the surface of terminals 15 and the surface of header 2.

Figure 6:
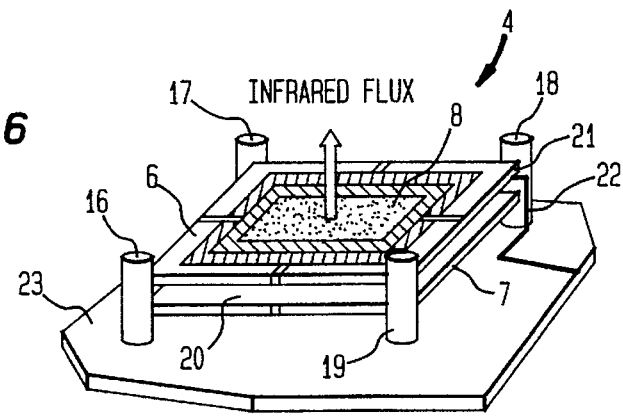
FIG. 6 shows two AFIR sensing elements held by common supports.

Alternatively, sensing assembly 4 may be designed as shown in FIG. 6 where elements 6 and 7 are held by several supports 16 to 19, thus eliminating the need for a separate spacer 5. In this arrangement, electrical connections to the terminals may be accomplished through one of several known techniques, such as wire bonding, conductive epoxy, surface metallization, etc. As an example, FIG. 6 shows a surface metallization of support 18. The metallization forms conductor 22 which is interfaced with element 6 at clamping area 21. The intended functional properties associated with the above and other arrangements for sensor assembly 4 include mechanical integrity, good thermal insulation between sensing elements, and electrical connections to sensor terminals.

In another embodiment, the sensing elements may be held inside the AFIR housing by the supports having low coefficient of thermal conductivity. This will minimize both the thermal crosstalk between the elements and the thermal loss from the elements to the sensor's housing. The electrical connections between the elements and the terminals can be accomplished through one of the standard methods known in the art, for instance, by a wire bonding technique. It is important for the heat loss reduction to assure that the wire lengths are maximized and the cross-sectional areas are minimized.

Figure 3:
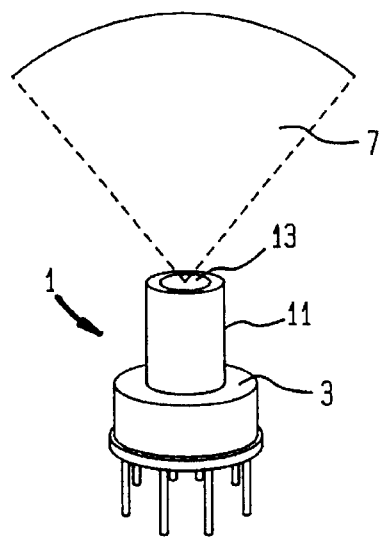
FIG. 3 is an isometric view of a sensor with a cylindrical optical guide.

For some applications a wide angle of view is required. In these cases, optical guide may have a cylindrical shape as it is depicted in FIGS. 1 and 3, where field of view 70-a is relatively wide. In other applications, the optical guide may be completely omitted. In a sensor without an optical guide, window 13, may be mounted directly at the rim of optical opening 40. In some other applications, especially for fabricating medical thermometers, a narrower field of view may be required. Then, a focusing lens may be installed into optical opening 40 instead of a window. Such a lens must be fabricated of a material with good transmission characteristics in the far infrared spectral range.

Figure 4:
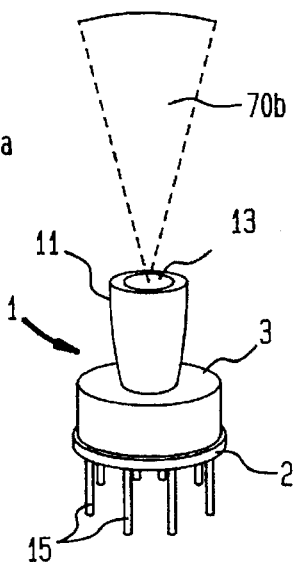
FIG. 4 is an isometric view of a sensor with a parabolic optical guide.
Figure 5:
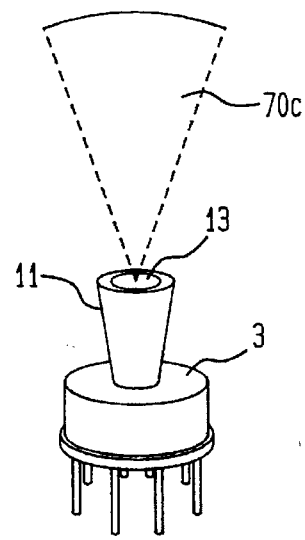
FIG. 5 is an isometric view of a sensor with a conical optical guide.

Alternatively, a nonimaging concentrator may be employed as an optical guide. Such concentrators are described for instance in W. T. Welford and R. Wilson, *High Collection Nonimaging Optics*. Academic Press Inc., 1989. (The teachings of which are incorporated by reference.) To illustrate use of concentrators, FIG. 4 shows optical guide 11 having a parabolic profile and FIG. 5 depicts a guide having a conical profile. Either optical guide 11 is covered with window 13 and provides a relatively narrow field of view 70-b and 70-c as compared with that shown in FIG. 3. A parabolic guide is generally more efficient for forming a narrower field of view than conical, however, the latter is easier to fabricate.

Returning again to FIG. 1, one may observe that each of identical sensing elements, 6 and 7, is a complex structure. Referring to element 6, this element is composed of substrate 14 with multilayer depositions on its surface. The order of layers is not critical, however there should be at least one temperature sensing layer 8, first resistive layer 9, and second resistive layer 10. For the practical purposes of manufacturing, it is usually preferable to keep sensing layer 8 on the top. There can be several electrically isolating layers between the conductive layers.

Figure 7:
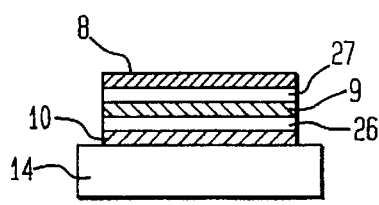
FIG. 7 is exploded cross-sectional view of an AFIR sensing element with multiple layers on one surface of a substrate.

A cross-section of an illustrative sensing element (suitable for either element 6 or 7) is depicted in FIG. 7, where isolating layers 26 and 27 are shown. In this arrangement, first and second resistive layers 9 and 10, respectively, serve as heaters, while sensing layer 8 is for measuring temperature of a multilayer structure. The above layers of element 6 are electrically isolated from one another and at the same time intimately thermally coupled to one another.

Figure 10:
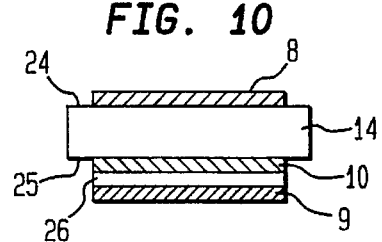
FIG. 10 is exploded cross-sectional view of a sensing element with multiple layers on both surfaces of a substrate.

Temperature sensing layer 8 may be deposited by sputtering technique forming a thin film of a semiconducting material which acts as a temperature sensitive resistor. If a substrate is fabricated of a material with high thermal conductivity, such as aluminum nitride, a temperature sensing layer 8 and resistive layers 9 and 10 may be deposited on the opposite sides of substrate 14 as it is illustrated in FIG. 10. This may simplify sensor fabrication because resistive layers 9 and 10, and insulating layer 26 may be formed by using a thick film technology, while temperature sensing layer 8 is formed by a thin film technology.

Figure 8:
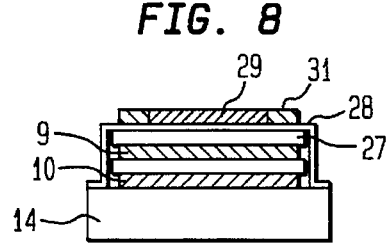
FIG. 8 is exploded cross-sectional view of a sensing element with a discrete temperature sensor having axial contacts.
Figure 9:
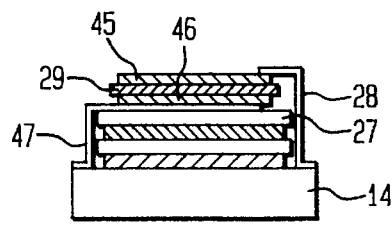
FIG. 9 is exploded cross-sectional view of a sensing element with a discrete temperature sensor having surface contacts.

Alternatively, a temperature sensing layer 8 may be replaced with a discrete temperature sensor. FIG. 8 illustrates use of a chip thermistor as temperature sensor 29 positioned on the top of a multilayer assembly. Temperature sensor 29 has end terminations in a form of conductors 31 which can be soldered or otherwise electrically connected to metal connection 28. Conductors 31 may be position at various sides of temperature sensor 29. FIG. 8 shows axial position of conductors 31, while FIG. 9 shows temperature sensor 29 with top metallization 45 and bottom metallization 46, which are respectively connected to connection 28 and contact pad 47. Connection 28 and contact pad 47 provide electrical interface between temperature sensor 29 and conductors on substrate 14, which, subsequently, are attached to the sensor terminals 15 (not shown in FIGS. 7–10). Discrete temperature sensor 29 must be well thermally connected to first and second resistive layers 9 and 10 to assure fast and efficient thermal control of the sensing element.

Specific to each arrangement is the requirement that the very top of the sensing assembly exhibit a high emissivity in the operating wavelength. Suitably, the upper surface is formed of metal, like top metallization 45 shown in FIG. 9. In these cases, the metallic surface must be treated to give it emissivity exceeding 0.9. This can be done by using one of standard methods known in the art (see, for instance, J. Fraden. "AIP Handbook of Modern Sensors" ©, American Institute of Physics, 1993, page 465, herein incorporated by reference).

Figure 11:
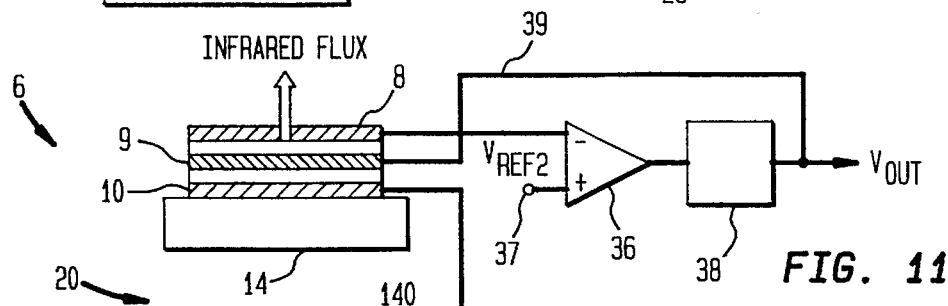
FIG. 11 shows a block diagram of a dual sensor attached to control circuits.

By definition, an AFIR sensor is active and, therefore, requires an external energy source to operate. This function is accomplished by an electronic circuit. In the present context of two separate sensor elements, a dual circuit is required. FIG. 11 illustrates a block diagram of such a circuit. In this diagram, the bottom section is connected to compensating element 7. The circuit consists of a first error amplifier 32 and first control circuit 34 which has a built-in power driver to supply electric current to second resistive layer 100 of compensating element 7. The circuit 34 also supplies an identical current to second resistive layer 10 of a radiating element 6. The current is supplied through conductor 35 and is manifested by output voltage $V_{comp}$.

In operation, first error amplifier 32 compares signal from temperature sensitive layer 80 with first reference signal $V_{refl}$ at its reference input 33 and feeds the difference to first control circuit 34. That circuit generates output voltage $V_{comp}$ of such a magnitude as necessary to maintain the output of temperature sensitive layer 80 nearly equal to first reference signal $V_{refl}$. The reference signal can be produced either by a voltage reference or by Wheatstone bridge (not shown). As long as first reference signal $V_{ref1}$ is predetermined, temperature of compensating element 7 is also maintained on a predetermined level, which may or may not be constant, depending of a particular application of the sensor.

Since both elements 6 and 7 are identical and their resistive layers 10 and 100 are supplied by identical currents from first control circuit 34, temperatures of these elements are close to one another. A difference in temperatures primarily may arise from a difference in optical conditions of elements 6 and 7. Radiating element 6 is allowed to emanate infrared flux toward an outside object, while compensating element 7 is shielded from that. On the top, it is prevented from radiating by warm substrate 14 whose temperature is nearly equal to that of substrate 140, and on the bottom, it faces reflective surface 41 of header 2.

In addition, the outer layer of compensating element 7 (which in FIG. 11 is temperature sensitive layer 80) may be metal coated to further reduce its emissivity. Therefore, compensating sensor may lose heat only through conduction and convection, while the radiating sensor can do that through radiation as well. Additional heat loss may result in some reduction in temperature of radiating element 6. To compensate for that reduction, signal from temperature sensing layer 8 is fed into second error amplifier 36 which has second reference signal $V_{ref2}$ provided to its reference input 37. Magnitude of $V_{ref2}$ is such as to assure equal temperatures of both sensing elements 6 and 7.

Continuing with FIG. 11, error signal from amplifier 36 is fed into second control circuit 38 which generates control signal 39 supplied to first resistive layer 9. Magnitude of control signal 39 is sufficient to generate heat equal to radiative loss toward a target. That signal is used as an output voltage $V_{out}$. Since nonradiative loss is nearly completely compensated for by first control circuit 34, second control circuit 38 needs to compensate only for the radiative loss from radiating element 6. Hence, output voltage $V_{out}$ is almost free of influence of ambient temperature, because ambient temperature determines nonradiative loss, while radiative loss is governed by the temperature of a remote target.

As elements 6 and 7 are separated by space 20 whose thermal conductivity is very low, both control circuits are well thermally decoupled. To make sure that decoupling is complete, conductor 35 preferably should be thin and long. Low thermal coupling between sensing elements 6 and 7 assures stable functioning of the sensor.

Figure 12:
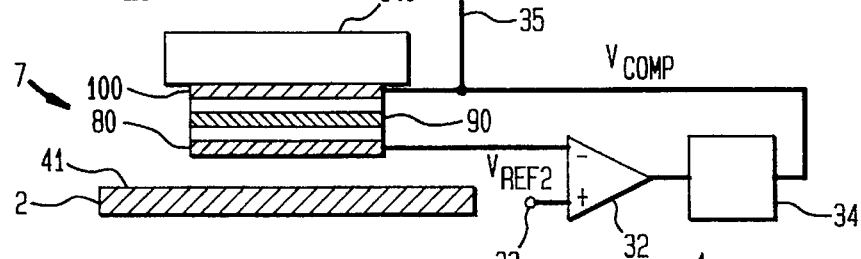
FIG. 12 is a sensing assembly with integrated circuit.
Figure 12:
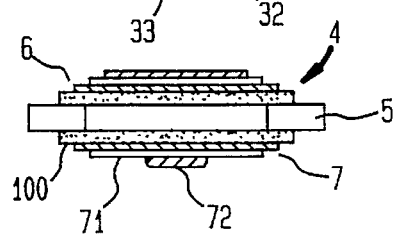

In many applications, it may be desirable to incorporate the sensor temperature control circuits inside the sensor housing. Most of electronic components may be fabricated in a form of an integrated circuit which can be positioned directly in the compensating element 7 as it is depicted in FIG. 12. A general configuration of the sensing assembly 4 is substantially the same as described above. The only difference is that the integrated circuit 72 is bonded on the surface of insulator 71. It is possible to incorporate a temperature sensing detector inside the integrated circuit chip, thus, compensating element 7 would not require temperature sensing layer 80 as in FIG. 11. Since first resistive layer 90 generally is not connected to and control circuit (FIG. 11), it can be omitted as in FIG. 12, where insulator 71 is deposited on the top of second resistive layer 100.

The above-described arrangement is merely illustrative of the principles of the present invention. Numerous modifications and adaptations thereof will be readily apparent to those skilled in this art without departing from the spirit and scope of the present invention.

What is claimed is:

1. An apparatus for determining the temperature of a remote object, comprising:

a radiation sensitive sensor assembly comprising a first remote object sensor element and a second reference sensor element wherein said first and second sensor elements are separated by a low heat conductivity barrier effective to thermally decouple said first and second sensor elements from each other and each sensor element providing an output signal, first and second individually controlled heater elements for controlled heating of said first remote object land second reference sensor elements;

a temperature compensating circuit for controlling said first and second individually controlled heater elements;

first and second temperature sensors thermally coupled to said first remote object and second reference sensor elements for sensing the temperature of said first remote object and second reference sensor elements;

said compensating circuit generating a compensating output signal responsive to temperature signals from said temperature sensors compared with reference signals, said output signal including a second output signal to said first and second heater elements and a first output signal to a third heater element in said first sensor element;

a sensor housing means for enclosing said radiation sensitive sensor assembly, wherein said sensor housing means includes an infrared radiation passage oriented to allow infrared radiative communication of said remote object with said first sensor element and prevents infrared radiative communication between said second sensor element and radiation sources external to said sensor housing means, said second sensor element disposed in said sensor housing means effective for receiving thermal radiation indicative of the thermal environment in said sensor housing means in which both of said sensor elements are housed; and temperature sensing means for determining the temperature of said remote object from said output signal from each of said first remote object sensor element and said second reference sensor element;

wherein said sensor housing means further provides an environment so that said first and second sensor elements exhibit essentially equivalent conductive and convective heat flux in response to ambient conditions.

2. The apparatus of claim 1 wherein said first and said second sensor elements are individually mounted to separate substrate means.

3. The apparatus of claim 2 wherein said first substrate means is spaced from said second substrate means to substantially preclude conductive heat transfer therebetween.

4. The apparatus of claim 1 wherein said first sensor element further comprises plural resistive layers interleaved therein with electrically isolating layers.

5. The apparatus of claim 1 wherein said first output signal corresponds to a radiating heat flux value of said first sensor element.

6. The apparatus of claim 1 wherein said infrared radiation passage further includes an optical guide to provide a pre-selected field of view of said remote object.

7. The apparatus of claim 6 wherein said optical guide provides a narrow field of view.

8. The apparatus of claim 1 wherein said radiation passage comprises a nonimaging concentrator to establish a narrow field of view of said remote object.

9. A method for determining the temperature of a remote object, comprising:

providing a radiation sensitive sensor assembly comprising a first remote object sensor element and a second reference sensor element wherein said first and second sensor elements are separated by a low heat conductivity barrier effective to thermally decouple said first and second sensor elements from each other, and each of said first remote object sensor and second reference sensor elements providing an output signal;

controlling the temperature of said first and second sensor elements by providing first and second individually controlled heater elements therefor and thermally coupled thereto and providing first and second temperature sensors therefor, including individually controlling said heater elements by means of a compensating circuit generating a compensating output signal responsive to temperature signals from said temperature sensors compared with reference signals, said output signal including a second output signal to said heater elements in both said first and second sensor elements and a first output signal to a third heater in said first sensor element;

providing a sensor housing means for enclosing said radiation sensitive sensor assembly, wherein said sensor housing means includes an infrared radiation passage oriented to allow infrared radiative communication of said remote object with said first sensor element and prevents infrared radiative communication between said second sensor element and radiation sources external to said sensor housing means, said second sensor element disposed in said sensor housing means effective for receiving thermal radiation indicative of the thermal environment in said sensor housing means in which both of said elements are housed;

determining the temperature of said remote object from said output signals from said first remote object sensor element and said second reference sensor element;

said sensor housing means further providing an environment in which said first and second sensor elements exhibit essentially equivalent conductive and convective heat flux in response to ambient conditions.

* * * * *